(12) United States Patent
Kamm

(10) Patent No.: US 6,375,220 B1
(45) Date of Patent: Apr. 23, 2002

(54) COMBINED STEERING COLUMN TUBE AND PEDAL ASSEMBLY FOR OCCUPANT PROTECTION

(75) Inventor: Martin Kamm, Berlin (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 09/530,853

(22) PCT Filed: Oct. 28, 1998

(86) PCT No.: PCT/DE98/03211

§ 371 Date: May 5, 2000

§ 102(e) Date: May 5, 2000

(87) PCT Pub. No.: WO99/24305

PCT Pub. Date: May 20, 1999

(30) Foreign Application Priority Data

Nov. 5, 1997 (DE) .......................... 197 49 970

(51) Int. Cl.$^7$ ................................................. B62D 1/19
(52) U.S. Cl. ...................................................... 280/777
(58) Field of Search ............................... 280/777, 775; 74/492, 493, 512

(56) References Cited

U.S. PATENT DOCUMENTS

| | | | | |
|---|---|---|---|---|
| 3,563,111 A | * | 2/1971 | Zeigler | 74/512 |
| 3,934,896 A | * | 1/1976 | Barenyi | 280/87 R |
| 4,022,495 A | | 5/1977 | Pizzocri | 280/750 |
| 4,674,354 A | * | 6/1987 | Brand | 74/492 |
| 4,886,295 A | * | 12/1989 | Browne | 280/77 |
| 5,113,716 A | * | 5/1992 | Dumschat et al. | 74/493 |
| 5,242,195 A | * | 9/1993 | Wendling | 280/777 |
| 5,320,384 A | * | 6/1994 | Arnold et al. | 280/777 |
| 5,351,573 A | * | 10/1994 | Cicotte | 74/512 |
| 5,449,199 A | * | 9/1995 | Heinrichs et al. | 280/775 |
| 5,482,320 A | | 1/1996 | Passebecq | 280/777 |
| 5,562,306 A | * | 10/1996 | Rispeter | 280/775 |
| 5,593,183 A | * | 1/1997 | Fouquet et al. | 280/775 |
| 6,116,648 A | * | 9/2000 | Holly et al. | 280/777 |
| 6,206,421 B1 | * | 3/2001 | Schremmer | 280/775 |

FOREIGN PATENT DOCUMENTS

| | | | |
|---|---|---|---|
| DE | 22 04 628 | 8/1973 | |
| DE | 24 17 543 | 10/1975 | |
| DE | 3642437 C1 | 3/1988 | |
| DE | 004340633 A1 | * 6/1994 | B60R/021/00 |
| DE | 195 01 859 | 7/1996 | |
| DE | 19542491 C1 | 2/1997 | |
| JP | 405178221 A | * 7/1993 | B62D/01/19 |
| JP | 405254448 A | * 10/1993 | B62D/01/19 |

* cited by examiner

Primary Examiner—Lanna Mai
Assistant Examiner—Paul Royal, Jr.
(74) Attorney, Agent, or Firm—Foley & Lardner

(57) ABSTRACT

In an occupant protection device for a driver's seat of a motor vehicle, a steering spindle is arranged in a jacket tube and a steering wheel is preferably provided with an airbag. The steering spindle is movable in the direction of its longitudinal axis and at least one energy-absorbing element is associated with the steering spindle. The advantage of the sliding steering spindle is that the whole steering system, including additional subassemblies secured thereto, is moved away from the occupant in the event of a crash. Depending on the intensity of the impact on the occupant, more or less energy is absorbed.

13 Claims, 3 Drawing Sheets

COMBINED STEERING COLUMN TUBE AND PEDAL ASSEMBLY FOR OCCUPANT PROTECTION

FIELD OF THE INVENTION

The invention relates to an occupant protection device for a driver's side of a motor vehicle.

BACKGROUND OF THE INVENTION

DE 195 01 859 A1 discloses a protection arrangement for a motor vehicle, in which a support element which is detached from a splashboard is rigidly connected to elements of the vehicle body whose position is virtually unchanged even in the event of an accident. The steering spindle of the motor vehicle is likewise connected to the support element, via a bearing. The steering spindle is furthermore mounted on a steering framework, the mounting being designed to be flexible in a specifically predetermined way. As a result, in the event of a crash, the steering spindle is pivoted downwards, so that an airbag installed in the steering wheel is brought into an improved position with respect to an occupant.

The steering spindle is designed to be telescoping and is designed with an integrated force limiter. Furthermore, in the event of a crash a foot pedal is moved away from the occupant by means of an actuating rod.

The disadvantage of this arrangement is the fact that in the event of a crash the force which is necessary for displacement of the steering spindle and which is introduced by the occupant is not adjusted to the severity of the accident.

SUMMARY OF THE INVENTION

The invention is based on the object of configuring the deformation performance of a steering system in the event of a vehicle crash in such a manner that said performance automatically sets itself to an occupant's mass and vehicle deceleration.

According to the invention, in the case of an occupant protection device for a driver's side of a motor vehicle, in which a steering spindle is guided in a steering-column tube, and a steering wheel is preferably provided with an airbag. The steering spindle is arranged such that it can move in the direction of its longitudinal axis, and said steering spindle is assigned at least one energy-absorbing element.

The advantage of the displaceable steering spindle resides in the fact that the entire steering gear, also including additional subassemblies secured on it, is moved away from the occupant in the event of a crash. As this happens, more or less energy is absorbed depending on the intensity of the impact on the occupant.

It is expedient for an energy-absorbing element to be arranged to adapt automatically to the mass and relative speed of the occupant colliding with the steering wheel or the airbag. This makes it possible to further reduce the risk of injury to the occupant.

This arrangement according to the invention can be realized in a number of embodiments.

Thus, in a first embodiment, provision is made for the steering-column tube to be guided displaceably on at least one holding part which is connected to a vehicle crossmember, which is very largely non-displaceable in the event of a crash. Provision is also made for the energy-absorbing element to be arranged between the steering-column tube and the holding part, the steering spindle being non-displaceable in the steering-column tube. The arrangement of a holding part, which is very largely non-displaceable in the direction of the occupant in the event of a crash, ensures that the steering-column tube, which is mounted displaceably in said holding part, and therefore the steering spindle is displaced away from the occupant. Even if the splashboard, which separates the passenger compartment from the engine compartment, is displaced by the impact in the direction of the occupant the tube and steering spindle are displaced away from the occupant.

It is expedient for the holding part, which is connected to the vehicle crossmember, to have at least one slot in which a guide pin, which is connected to the steering-column tube, engages. It is also expedient for a hydraulic arrangement with a piston and a cylinder to be provided as the energy-absorbing element, the piston being connected to the steering-column tube or to the holding part, and the cylinder being connected to the other part in each case. The holding part preferably has two slots which essentially extend in the direction of the longitudinal axis of the steering-column tube and which are each assigned a guide pin. Each guide pin is secured on a connecting part which is connected to the steering-column tube.

In a further refinement, provision is made for the steering-column tube to have, at its end which faces the occupant, at least one support for a switch unit. This support additionally serves as an element which impedes the deformation of the steering wheel in the event of a crash and therefore prevents the airbag from being deployed in the direction of the vehicle roof instead of in the direction of the occupant.

In a further refinement, a pedal-assembly auxiliary support is provided which is secured pivotably on the holding part at one end, is furthermore secured pivotably on the steering-column tube, and on whose other end is secured to at least one of the clutch, brake and gas pedals. The arrangement of the pedals in this manner achieves the effect that said pedals are pivoted away from the occupant in the event of a crash. The pedal-assembly auxiliary support is expediently connected to the steering-column tube via a clamping device. Releasing this clamping device enables the pedal assembly to be adjusted to the occupant before the-journey is begun. Once the clamping arrangement is fixed in position, the pedal-assembly auxiliary support is connected fixedly to the steering-column tube, so that in this embodiment too, the described advantageous action occurs in the event of a crash.

In a second embodiment, the steering-column tube is connected fixedly to the very largely non-displaceable vehicle crossmember, and the steering spindle can be displaced in the steering-column tube, in the direction of its longitudinal axis. In the case of this embodiment, the steering spindle can therefore be displaced directly.

In a further refinement of this embodiment, a guide bush (or bushing) for the steering spindle is provided in the steering-column tube. The guide bush is rotatable, but is axially non-displaceable, in the steering-column tube. The steering spindle can only be displaced axially in the guide bush. The steering spindle is expediently provided with a serration which is assigned a corresponding serration in the guide bush.

In this embodiment, the steering spindle and the guide bush expediently form a piston-cylinder arrangement, in which the cylinder space is divided by the piston into two chambers which can be connected to each other via at least one valve. Preferably, a plurality of valves which are connected in parallel are provided. A number of valves which differs as a function of the occupant's mass and relative speed of the occupant is brought into a working position. This is brought about by means of sensors which are known per se and by means of an associated control system.

Instead of valves which are connected in parallel, at least one valve having a variable cross section may also be provided.

BRIEF DESCRIPTION OF THE DRAWINGS

The invention will be explained in exemplary embodiments with reference to drawings, in which.

DETAILED DESCRIPTION

Figure 1:
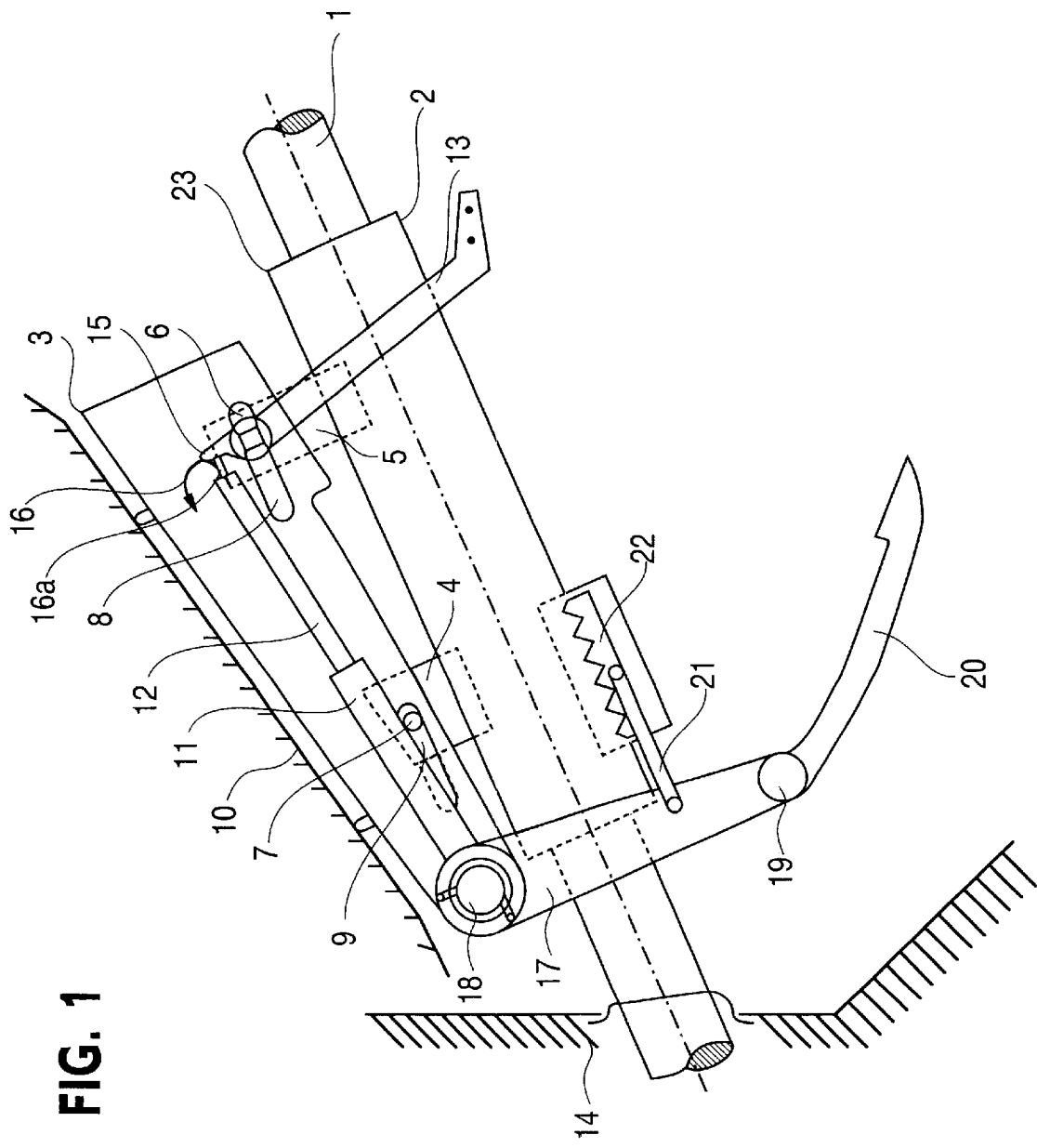
FIG. 1 shows a side view of a section of a steering spindle with a steering-column tube which can move in a direction of its longitudinal axis.

In the exemplary embodiment of FIG. 1, a steering spindle 1 is mounted rotatably in a steering-column tube 2, but such that it cannot move in the axial direction. The steering-column tube 2 is guided such that it can move in the direction of its longitudinal axis on a holding part 3. For this purpose, there are secured, for example welded, on the steering-column tube 2 two connecting parts 4, 5 which each have a guide pin 6, 7. Each guide pin reaches into a respective slot 8, 9 in the holding part 3. The holding part 3 is secured on a crossmember 10 of the motor vehicle, which crossmember very largely retains its position in the event of a crash and so the holding part 3 is positionally stable too. This means that it is unnecessary to mount the steering spindle in a splashboard 14, so the crash performance of the steering system is largely independent of the deformation of the splashboard.

An energy-absorbing element in the form of a piston-cylinder arrangement is provided between the holding part 3 and the steering-column tube 2. In this arrangement, a cylinder 11 is connected to the holding part 3, and a piston 12 is connected to the guide pin 6. Apart from absorbing energy in the event of a crash, this piston-cylinder arrangement can also be used to set the steering spindle. In order to adjust the steering spindle longitudinally and therefore to set it to the particular size of the driver, a lever 13 is provided which can be pivoted about the guide pin 6. In order to make the longitudinal adjustment, a valve 16a is actuated by means of the upper part 15 of the lever 13. Opening of the valve 16a enables hydraulic fluid to flow via a line 16 into a vessel (not shown), so that the piston can easily be displaced in the cylinder. After the valve 16a is closed, the function of the piston-cylinder arrangement as an energy-absorbing element is restored. During the displacement of the steering-column tube in order to adjust the steering spindle longitudinally, the guide pins 6, 7 are only displaced in the slots 8, 9 by an amount which is substantially smaller than the overall length of the slots. Therefore, a sufficient displacement path is still available in the slots for the displacement of the guide pins in the event of a crash.

An entire pedal assembly of the motor vehicle is likewise connected to the holding part 3 via an auxiliary support 17 by an upper end 18 being secured pivotably on the holding part 3. The pedals, of which only one pedal 20 can be seen, are arranged pivotably at a lower end 19 of the auxiliary support. In its middle section, the auxiliary support 17 is connected to the steering-column tube 2 via a lever 21 and a clamping means 22. Release of the clamping means 22 enables the entire pedal assembly to be pivoted and set in accordance with the driver's wishes. When the clamping means is fixed in place, the auxiliary support 17 is connected fixedly to the steering-column tube 2.

A support 23 for a switch unit is secured on an upper end of the steering-column tube 2. This support is additionally intended to impede deformation of a steering wheel 40 in an upper steering-wheel rim region in order thereby to obtain a crash-optimized deformation performance of the steering wheel over the entire steering-wheel angle range.

Figure 2:
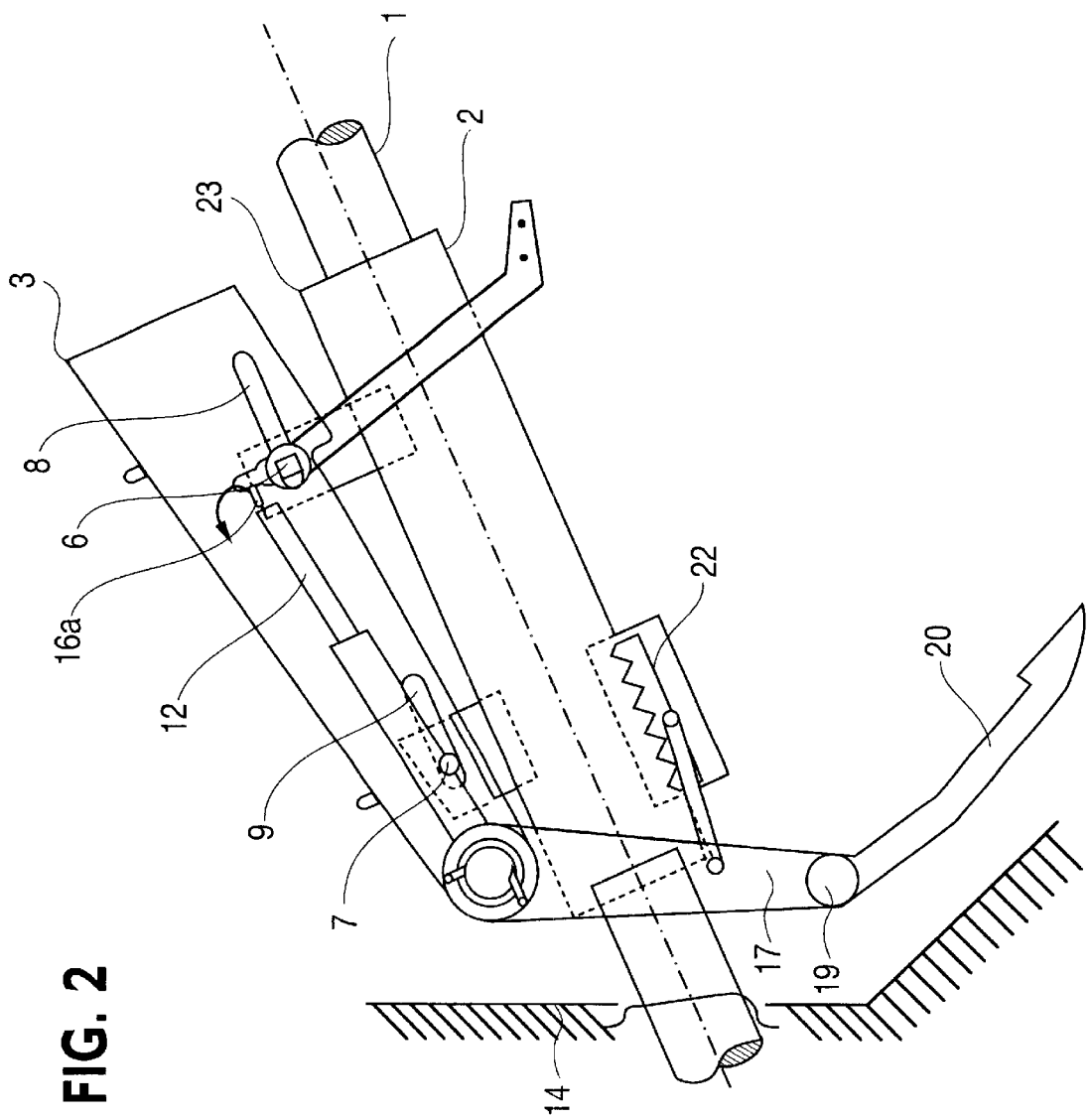
FIG. 2 shows the steering spindle of FIG. 1 after a crash.

While FIG. 1 shows the normal position of the steering spindle and the pedal assembly, in FIG. 2 the position thereof after a crash is illustrated. In this figure, the steering-column tube 2 is displaced in the direction of the splashboard 14, i.e. to the left in. the figure, and the guide pins 6, 7 bear against the left end of the slots 8, 9. This displacement of the steering-column tube 2 together with the steering spindle 1 is caused by the impact of the occupant on the steering wheel or on the airbag. This impact causes pressure to be exerted via the steering-column tube on the piston 12. After a certain level of force at least one valve is opened, so that energy is degraded. A further valve arrangement is explained further on with reference to FIG. 3.

As a consequence of the displacement of the steering-column tube 2, the lower end 19 of the pedal-assembly auxiliary support 17, which is connected non-displaceably to said steering-column tube, is also displaced together with the entire pedal assembly away from the driver in the direction of the splashboard 14, as can likewise be seen in FIG. 2.

Figure 3:
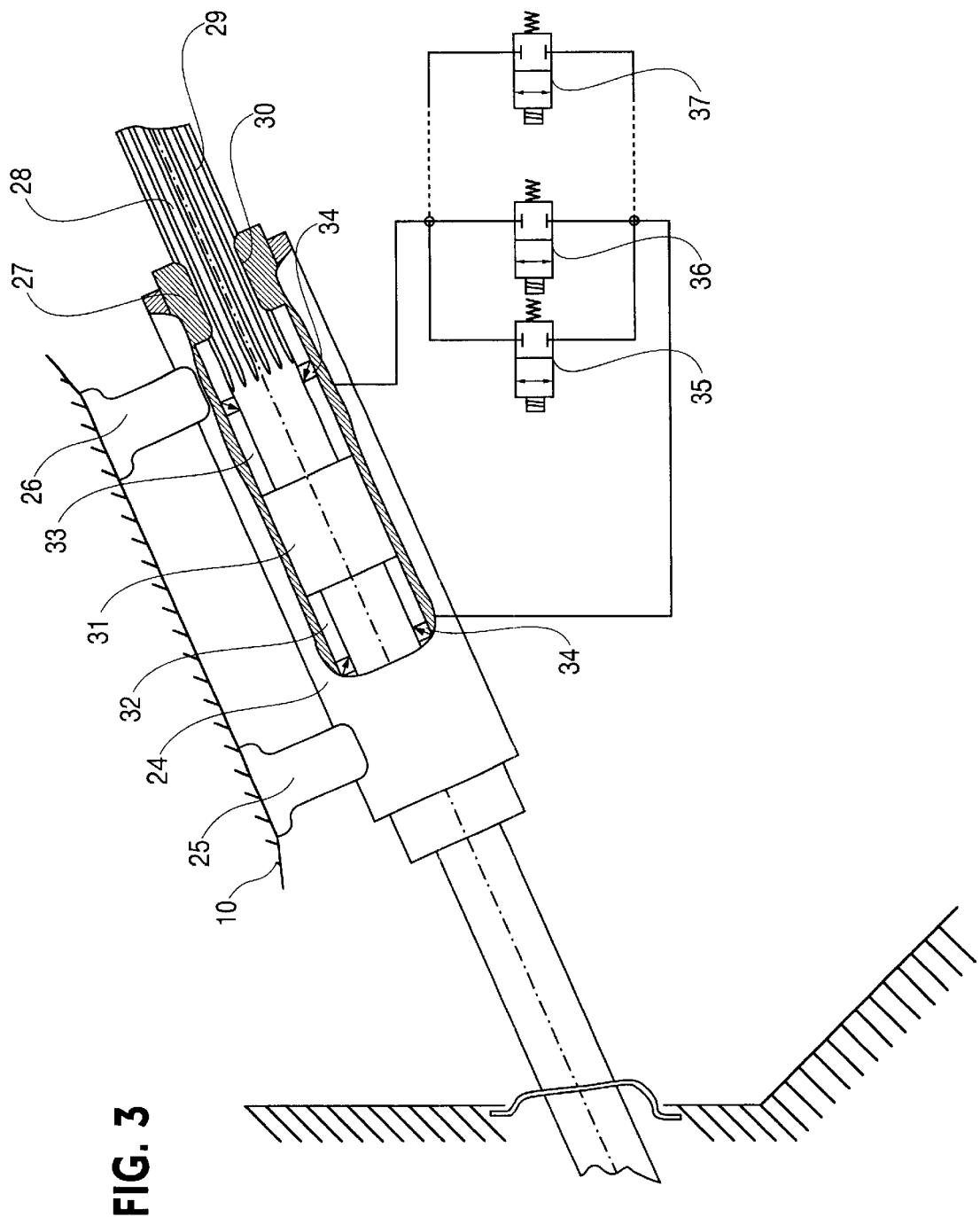
FIG. 3 shows a side view, partially cut away, of a steering spindle which is movable in the direction of its longitudinal axis in an immovable steering-column tube.

In the exemplary embodiment of FIG. 3, a steering-column tube 24 is provided which is connected fixedly to the crossmember 10 via connecting parts 25, 26. Mounted in the steering-column tube 24 is a steering column consisting of two parts, said parts forming a piston-cylinder arrangement. One part is thus designed as a bushing 27 which is mounted rotatably in the steering-column tube 24. A steering spindle 28, which is mounted in an axially displaceable manner in the bushing 27, runs through this bushing 27. The torque applied to the steering wheel is transmitted to the bushing by a serration 29 around the circumference of the steering spindle 28 and by a corresponding serration 30 in the bushing 27.

In its central region, an internal diameter of the bushing 27 is larger than a diameter of the steering spindle 28. This clearance is divided by a piston 31, which is provided on the steering spindle, into two chambers 32,33 which are sealed off to the outside by sealing elements 34. The two chambers are connected to each other via valves 35, 36, 37 which are connected in parallel.

A closed volume of a suitable medium, preferably a fluid, is situated in the chambers 32, 33 and in the lines connecting them. In the basic position which is illustrated, the connection between the chambers 32, 33 is interrupted, i.e. the axial displaceability of the steering spindle 28 and therefore of the steering wheel (not illustrated) is blocked. In order to adjust the steering column, all of the valves are brought into their working position in which they have a predetermined through-flow cross section. Axial displacement using little effort is therefore possible by the medium being pressed out of the chamber 32 into the chamber 33 and vice versa.

In the event of a crash, as the energy-absorbing element, the piston-cylinder arrangement of the steering column ensures that the energy caused by an occupant colliding with the steering wheel directly, or indirectly via a deployed gas bag, is degraded. In this arrangement, the valve system enables the damping performance to adjust automatically to the severity of the accident. For this purpose, a number of valves 35, 36, 37 which differs as a function of the mass and the relative speed of the occupant, is brought into their working position and the through-flow cross section therefore varies. Displacement of the medium from chamber 32 to chamber 33 is therefore possible at a different level of force. The necessary number of valves is set by means of sensors (not illustrated) and an assigned control switch system, which is known per se.

The valve arrangement described with respect to FIG. 3 can also be used for controlling the piston-cylinder arrangement of FIG. 1.

What is claimed is:

1. An occupant protection device for a driver's side of a motor vehicle, comprising:

a steering-column tube;

a steering spindle guided in the steering-column tube;

at least one energy-absorbing element;

at least one holding part adapted to be coupled to a stationary part of the vehicle, wherein the steering-column tube is displaceably mounted relative to the at least one holding part, wherein the energy-absorbing element is arranged between the steering-column tube and the holding part, wherein the steering spindle is non-displaceable relative to the steering-column tube along a longitudinal direction; and a pedal-assembly auxiliary support, wherein one end of the pedal assembly auxiliary support is pivotably mounted to the holding part, and secured to the steering-column tube, and wherein the opposite end of the pedal assembly auxiliary support is adapted to be mounted to at least one of a clutch, a brake pedal and a gas pedal.

2. The occupant protection device according to claim 1, wherein the steering-column tube has a guide pin, wherein the holding part has a slot in which the guide pin engages, wherein the energy-absorbing element is a hydraulic arrangement having a piston and a cylinder, wherein the piston is coupled to one of the steering-column tube and the holding part, and the cylinder is coupled to the other one of the steering-column tube and the holding part.

3. The occupant protection device according to claim 1, further including a pair of connecting parts connecting the steering-column tube to the holding part, wherein each of the connecting parts has a guide pin, and the holding part has two slots that extend parallel to the longitudinal axis of the steering-column tube, each of the slots being assigned to one of the guide pins.

4. The occupant protection device according to claim 1, wherein the steering-column tube has at least one support for a switch unit at one end.

5. The occupant protection device according to claim 1, wherein the pedal-assembly auxiliary support is coupled with the steering-column tube via a clamping device.

6. An occupant protection device for a driver's side of a motor vehicle, comprising:

a steering-column tube;

a steering spindle guided in the steering-column tube, the steering spindle being displaceable along a longitudinal axis thereof relative to the tube;

at least one energy-absorbing element coupling the steering spindle and the steering-column tube; and at least one connecting part adapted to be mounted to a stationary part of the vehicle and connected to the steering-column tube, wherein the energy-absorbing element is a hydraulic arrangement having a piston and a dual cylinder, and at least one valve controlling flow between two chambers formed by the dual cylinder, and wherein the steering spindle carries the piston and the steering column forms the two chambers, the piston being positioned between the two chambers.

7. The occupant protection device according to claim 6, wherein the energy absorbing element comprises a hydraulic device having a piston, two cylinders, and at least one valve, wherein the piston is positioned between the two chambers, which are communicable with each other via the at least one valve.

8. The occupant protection device according to claim 7, comprising at least two valves connected in parallel for coupling the two chambers.

9. The occupant protection device according to claim 7, a plurality of valves that couple the two chambers.

10. The occupant protecting device according to claim 7, wherein at least one valve is a variable cross section valve.

11. The occupant protection device according to claim 8, further comprising a bushing nested in between the steering-column tube and the steering spindle, wherein the energy-absorbing element is a hydraulic arrangement having a piston and a cylinder, wherein the steering spindle carries a piston and the steering-column tube forms the cylinder.

12. The occupant protection device according to claim 11, wherein the area between the bushing and the steering spindle is divided by the piston into two chambers, wherein the energy absorbing element has at least one valve, wherein the two chamber are coupled with each other via the at least one valve, wherein flow between the two chambers is released through the at least one valve.

13. The occupant protection device according to claim 12, further including a plurality of valves.

\* \* \* \* \*